United States Patent [19]

Ingram

[11] 3,833,401

[45] Sept. 3, 1974

[54] DEGRADABLE POLYETHYLENE FILM

[75] Inventor: Alvin R. Ingram, Murrysville, Pa.

[73] Assignee: Arco Polymers, Inc., Pittsburgh, Pa.

[22] Filed: Nov. 16, 1972

[21] Appl. No.: 307,030

[52] U.S. Cl. ................... 117/38, 8/138.8 E, 47/9
[51] Int. Cl. ..................... 47 DIG. 7, B41m 1/40
[58] Field of Search .......... 117/38, 138.8 E, 12, 14; 47/9, DIG. 7

[56] References Cited
UNITED STATES PATENTS

| | | | |
|---|---|---|---|
| 3,320,695 | 5/1967 | Moore | 47/9 |
| 3,454,510 | 7/1969 | Newland et al. | 260/23 |
| 3,679,777 | 7/1972 | Lambert | 260/897 A |

Primary Examiner—Herbert B. Guynn
Assistant Examiner—Bruce H. Hess
Attorney, Agent, or Firm—Dr. L. J. Young

[57] ABSTRACT

Polyethylene film is caused to degrade in a predetermined pattern by the printing of the pattern on the surface of the film using printing ink containing a degradation promoter such as ultraviolet sensitizers, oxidation promoters, or embrittling agents.

3 Claims, No Drawings

DEGRADABLE POLYETHYLENE FILM

BACKGROUND OF THE INVENTION

This invention relates to a method of rendering polyethylene film disintegrable.

It is known to use polyethylene films as an agricultural mulch. These polyethylene mulches are useful because of the ease of their application, planting can be accomplished directly through the film, and the film increases the soil temperature and water retention, lengthens the growing season, and retards the growth of weeds.

A major drawback to the use of the polyethylene film as agricultural mulch is the stability of the film to the environment. When the planted crop has grown up and been harvested, the film is normally still intact and must be removed from the field prior to plowing in preparation for the new planting.

Polyethylene degrades, oxidizes, and embrittles when exposed to outdoor weathering conditions. Normally these changes are slow and the film outlasts the growing period of the crop. Additives have been found which when added to the polymer will catalyze the degradation of the film. Thus, certain additives are known to absorb ultraviolet light from the sun and transfer their energy to the polymer to cause photodegradation. Among the photosensitizing additives are certain ketones, and hydrocarbons such as benzene, pyrene, and naphthalene. Other additives, such as the metal stearates, especially in conjunction with metal powders or salts such as copper powder, are known to promote oxidative degradation. Certain metal chelates, such as the heavy duty metal acetylacetonates, have been used to promote light sensitivity, especially in the presence of carbonyl compounds. Additives which promote biodegradability in the polymer have also been developed.

These additives are generally incorporated into the polyethylene prior to the formation of the film. Their presence in the polymer creates processing problems during the extrusion of the film.

SUMMARY OF THE INVENTION

It has now been found that the degradation of polyethylene film can be accelerated by printing the surface of the film with an ink containing a degradation promoter such as ultraviolet sensitizers, oxidation promoters, or embrittling agents. The printing may be uniform, as in a coating, or may be in any predetermined pattern to allow selected portions of the film to remain intact as mulch in smaller size which can be plowed into the soil without difficulty.

DETAILED DESCRIPTION OF THE INVENTION

The invention is a process for accelerating the rate of degradation of polyethylene film comprising printing a degradation promoter on the surface of the film.

Methods of applying printing ink to polyethylene film have been developed in the recent years. Because of the smooth, non-porous character of the film surface, the surface must be prepared for the reception and adhesion of the ink. Treatment of the surface with an electric glow discharge or with a flame treatment are two of the known methods.

Because the degradation promoter is to be printed on the surface of the polyethylene film, any suitable commercially available film can be used as sold. This eliminates the need for several special grades of film based on the particular additive desired.

The various additives, either individually or in combination, are incorporated into an ink formation and printed onto the surface of the film. The additives can then be absorbed into the film according to their rates of diffusion into the polyethylene. The size and shape of the residual particles of film after degradation is complete can be controlled by the pattern of the printing on the surface.

The process of the invention allows one a considerable latitude in the formulations available. The additives may be any of the known degradation promoters such as sensitizers to sunlight, oxidation promoters, embrittling agents, or compounds which promote biodegradation. The particular type of additive or combination of types can be selected for the individual weather conditions which predominate in the geographical area of use of the film. Thus, ultraviolet sensitive additives may be used in predominantly sunny climates. In shady areas, an oxidation promoter may be more appropriate.

In addition to the degradation promoters, other ingredients may be used in the preparation of the printing ink in order to improve the adhesion to the film and the general printability. Various binders, vehicles, and pigments may be added as needed to provide the consistency and properties necessary for printing. The pigments must be omitted or carefully selected to ensure adequate transmission of sunlight, air or water into the film through the printed layer.

The invention is further illustrated by the following examples, in which parts are by weight unless otherwise indicated.

EXAMPLE I

A 2 mil thick film of polyethylene was divided into two parts. One part was imprinted in accordance with the invention. This part was prepared for printing by subjecting it to an electric discharge as described in U.S. Pat. No. 2,859,480. An ink was prepared by mixing one part of zinc stearate, one part of copper powder, one part of an oil-soluble alkyd resin as binder, and sufficient commercial hydro-carbon solvent (Skellysolve sold by Skelly Oil Company) to give a consistency of a viscous printing ink. The ink so prepared was rolled onto the surface of the above polyethylene film and allowed to dry. The resulting printed film was degraded in air at a faster rate than the unprinted film.

EXAMPLE II

A 4 mil thick film of polyethylene was imprinted in accordance with the invention after preparing the surface as in Example 1. An ink was prepared by mixing one part of napthalene, one part of benzophenone, one part of shellac as binder, and sufficient benzene to form a paste of printable consistency. The ink was then printed onto the polyethylene film in a pattern such that portions of the film contained no ink, and allowed to dry. On exposure to sunlight, the printed portions of film degraded at a faster rate than the unprinted portions.

What is claimed is:

1. A process for accelerating the rate of degradation of polyethylene film comprising printing a degradation promoter selected from the group consisting of ultraviolet sensitizers, oxidation promoters, embrittling agents, and mixtures thereof, on the surface of said film whereby said promoter may diffuse into the film.

2. The process of claim 1 wherein the degradation promoter is printed in a continuous coating whereby the entire film is degraded uniformly.

3. The process of claim 1 wherein the degradation promoter is printed in a discontinuous pattern whereby the printed portions of the film are degraded more rapidly than the unprinted portions.

* * * * *